G. CORNWALL.
Wheels for Vehicles.

No. 156,281.        Patented Oct. 27, 1874.

WITNESSES:

INVENTOR:
G. Cornwall
BY
Munn & Co.
ATTORNEYS.

UNITED STATES PATENT OFFICE

GEORGE CORNWALL, OF PLAINFIELD, NEW JERSEY.

IMPROVEMENT IN WHEELS FOR VEHICLES.

Specification forming part of Letters Patent No. 156,281, dated October 27, 1874; application filed August 22, 1874.

*To all whom it may concern:*

Be it known that I, GEORGE CORNWALL, of Plainfield, in the county of Union and State of New Jersey, have invented a new and Improved Carriage-Wheel, of which the following is a specification:

The invention will first be fully described, and then pointed out in the claim.

Figure 1:
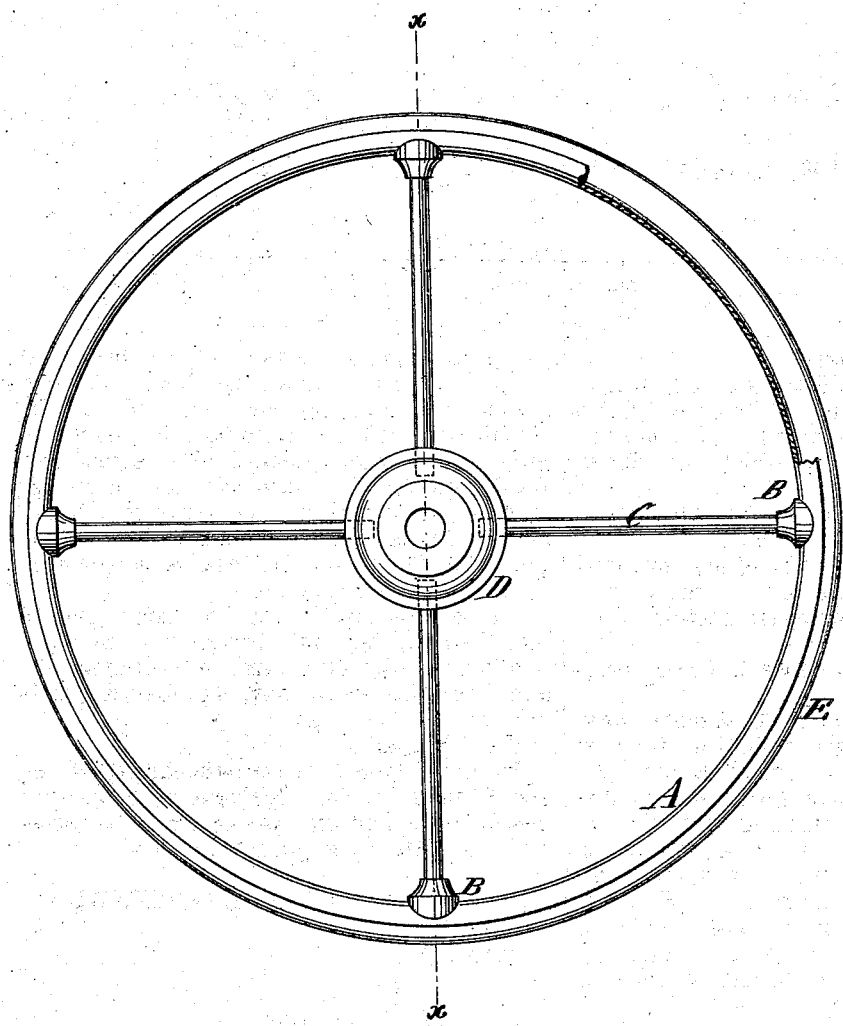
Figure 2:
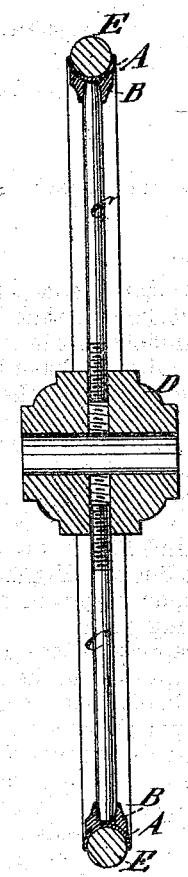

Figure 1 is a side elevation of my improved wheel with a part of the felly or rim in section; and Fig. 2 is a transverse section taken on the line $x\,x$, Fig. 1.

Similar letters of reference indicate corresponding parts.

A represents the rim, of sheet metal, having a groove in the face of half a circle, or thereabout; also having sockets B upon the inner periphery for the reception of the outer ends of the spokes C, which screw at the inner end deep into the hub D, so as to enter the socket, and then screw out again sufficiently to screw them in the rim. E represents the tire or tread of the wheel, which is made of round vulcanized rubber nicely fitting in the groove, and stretched over the side of the rim into the groove, and held fast in the groove by the sides.

This arrangement makes a very cheap and simple, noiseless, and elastic wheel, peculiarly adapted for children's carriages, and very desirable on account of avoiding noise when running over a floor. Instead of screwing outward from the hub into the rim the spokes may be passed through the rim into the hub and be fastened by a nut screwed on in the groove, in which case the sockets may be used or not, as preferred.

I am aware that it is old to screw spokes into the hub, then out through the rim, and finally rivet the outer end in a countersink; and I am also aware that a concaved rim is old; but

What I claim is—

The combination of screw-socketed hub D, end-threaded spokes C, elastic hollow sheet-metal rim A, and the rubber tire E, substantially as and for the purpose set forth.

GEO. CORNWALL.

Witnesses:
A. P. THAYER,
ALEX. F. ROBERTS.